US008560516B2

(12) United States Patent
Chiu (10) Patent No.: US 8,560,516 B2
(45) Date of Patent: Oct. 15, 2013

(54) LOCAL SEARCH METHOD AND SYSTEM

(75) Inventor: Hsin-Hsiung Chiu, Taichung County (TW)

(73) Assignee: Mitac International Corp., Hsinchu (TW)

( * ) Notice: Subject to any disclaimer, the term of this patent is extended or adjusted under 35 U.S.C. 154(b) by 273 days.

(21) Appl. No.: 12/552,916

(22) Filed: Sep. 2, 2009

(65) Prior Publication Data
US 2010/0070519 A1 Mar. 18, 2010

(30) Foreign Application Priority Data

Sep. 17, 2008 (TW) ................................ 97135613 A (51) Int. Cl.
*G06F 17/30* (2006.01)
(52) U.S. Cl.
USPC ............ 707/708; 707/706; 707/705; 707/758
(58) Field of Classification Search
USPC ................................................. 707/705, 706
See application file for complete search history.

(56) References Cited

U.S. PATENT DOCUMENTS

| 7,769,746 | B2* | 8/2010 | Lu et al. ......................... 707/713 |
|---|---|---|---|
| 2003/0202002 | A1* | 10/2003 | Kethireddy .................... 345/705 |
| 2005/0256766 | A1* | 11/2005 | Garcia et al. .................... 705/14 |
| 2007/0152978 | A1* | 7/2007 | Kocienda et al. ............. 345/173 |
| 2008/0048986 | A1* | 2/2008 | Khoo ............................ 345/168 |
| 2009/0063206 | A1* | 3/2009 | Payne et al. ........................ 705/5 |
| 2009/0307318 | A1* | 12/2009 | Chappell et al. ............... 715/764 |
| 2010/0029305 | A1* | 2/2010 | Gupta ............................ 455/466 |
| 2011/0270863 | A1* | 11/2011 | Pfleger ........................... 707/759 |
| 2012/0084296 | A1* | 4/2012 | Waters ........................... 707/742 |
| 2012/0109925 | A1* | 5/2012 | Morscher et al. ............. 707/706 |

FOREIGN PATENT DOCUMENTS

| TW | I221234 | 9/2004 |
|---|---|---|
| TW | M303429 | 12/2006 |
| TW | 20071571 A | 4/2007 |

* cited by examiner

*Primary Examiner* — Wilson Lee
*Assistant Examiner* — Tiffany Thuy Bui
(74) *Attorney, Agent, or Firm* — Ladas & Parry, LLP (57) ABSTRACT

A local search method to be implemented by a portable electronic device is provided for searching a database that contains a plurality of data sets, each of which includes location information and content information. The local search method includes the steps of: (a) upon obtaining a search condition word string inputted by a user, determining whether the search condition word string contains a predefined symbol; and (b) when it is determined in step (a) that the search condition word string contains the predefined symbol, setting a string segment before the predefined symbol as a content condition, and a string segment after the predefined symbol as a location condition, and conducting a type-one search on the database, in which the database is searched for at least one data set whose content information corresponds to the content condition and whose location information corresponds to the location condition.

16 Claims, 6 Drawing Sheets

LOCAL SEARCH METHOD AND SYSTEM

CROSS-REFERENCE TO RELATED APPLICATION

This application claims priority of Taiwanese Application No. 097135613, filed on Sep. 17, 2008.

BACKGROUND OF THE INVENTION

1. Field of the Invention

The invention relates to a local search method and system, more particularly to a local search method and system utilizing a predefined symbol to distinguish between a content condition and a location condition in a search condition word string.

2. Description of the Related Art

At present, portable electronic devices, such as personal navigation assistants (PNA), intelligent mobile phones, etc., provide bi-directional connected navigation services, in which real-time location-based service (LBS) is provided by a server to portable electronic devices, and local search can be conducted by the portable electronic devices to obtain real-time dynamic information, such as traffic conditions, weather conditions, etc., based on their current locations.

The so-called "local search" is realized by combining search technology with e-Maps and e-Yellow pages, and may be implemented in a web page and a portable electronic device for obtaining information related to daily lives of the user, such as transportation, food, leisure activity, work, etc.

A first conventional local search system provides simultaneously on a display screen two fields for user input respectively of a content search condition and a location search condition in order to initiate a search. For example, if it is desired to search for cafés in Taipei, the word string "café" is inputted in the field corresponding to the content search condition and the word string "Taipei" is inputted in the field corresponding to the location search condition. However, providing two fields simultaneously takes up quite a lot of the relatively small screen space of the portable electronic device.

A second conventional local search system is designed such that the two fields are displayed in sequence, with the display of the second field appearing only after input of the first field has been completed and the first field has disappeared from the display screen.

However, for both the first and second conventional local search systems, the search can only be initiated when there is input in both fields. In other words, it is not possible to launch a search when it is desired to search for a certain content without specifying a location.

Moreover, if search results are abundant, data transmission fee may reach a significant amount. There are currently no local search methods that can assist a user in restricting the scope of his/her search. From the foregoing, it is evident that there is room for improvement in the field of local search for portable electronic devices.

SUMMARY OF THE INVENTION

Therefore, the object of the present invention is to provide a local search method that is more convenient for execution and that can assist a user in narrowing the scope of search so as to avoid overabundant data transmission, and a local search system, a portable electronic device, a computer program product, and a user interface for implementing the same.

Accordingly, the local search method of the present invention can be implemented through a computer program product that is recorded in a storage medium or a server. The computer program product may be loaded into and executed by a portable electronic device (such as a PNA, an intelligent mobile phone, etc.) or a computer. This is equivalent to implementing the local search system according to the present invention in a portable electronic device or a computer. A portable electronic device implementing the local search system may communicate with a database that contains a plurality of data sets via general packet radio service (GPRS), third generation (3G) mobile communication, wireless local area network (WLAN), etc. On the other hand, a computer implementing the local search system may be connected to the database via the Internet. The database may be an e-Yellow page database, an e-Map database, etc.

The local search system for implementation in a portable electronic device according to the present invention configures the portable electronic device for searching the database. Each of the data sets in the database includes location information and content information. The electronic device includes a display screen and a processor. The local search system includes a user interface, a judging module and a search module. The user interface is to be loaded into the processor for configuring the processor to enable the display screen to display a single field for input of a search condition word string by a user. The judging module is to be loaded into the processor for configuring the processor to determine whether the search condition word string contains a predefined symbol, and to set, upon determining that the search condition word string contains the predefined symbol, a string segment before the predefined symbol as a content condition, and a string segment after the predefined symbol as a location condition. The search module is to be loaded into the processor for configuring the processor to conduct a type-one search on the database, in which the database is searched for at least one data set whose content information corresponds to the content condition and whose location information corresponds to the location condition. The search module further configures the processor to conduct a type-two search on the database, in which the database is searched for at least one data set that has a match with the search condition word string, upon determining that the search condition word string does not contain the predefined symbol.

Preferably, the predefined symbol is "@". The local search system may further include a touchpad, or a keyboard that includes a "@" key. Alternatively, the display screen may be a touch control display screen, and the user interface may further configure the processor to enable the display screen to display a virtual keyboard for selection by the user, where the virtual keyboard contains a "@" key.

Preferably, the local search system further includes a search assisting module, which is to be loaded into the processor for configuring the processor to determine if a total number of said at least one data set resulting from the type-one search exceeds a first predefined number, and to enable the display screen to display, upon determining that the total number of said at least one data set resulting from the type-one search exceeds the first predefined number, a dialog box containing a narrow area scope option that is available for selection by the user. The search assisting module further configures the processor to enable the display screen to display, upon detection of selection of the narrow area scope option, a plurality of restricted location options that represent restricted locations corresponding to the location condition and that are available for selection by the user. The search module further configures the processor to search, upon detection of selection of one of the restricted location options, for at least one data set in the database whose content information corresponds to the content condition and whose location information corresponds to the selected one of the restricted location options.

Moreover, the search assisting module further configures the processor to determine if a total number of said at least one data set resulting from the type-two search exceeds a second predefined number, and to enable, upon determining that the total number of said at least one data set resulting from the type-two search exceeds the second predefined number, the display screen to display a dialog box containing an add location condition option available for selection by the user. The search assisting module further configures the processor to enable the display screen to display the predefined symbol right after the search condition word string upon determining that the add location condition option has been selected by the user. Upon obtaining a supplemented search condition word string inputted by the user, the judging module further configures the processor to set a string segment after the predefined symbol as the location condition, and the search module further configures the processor to search for at least one data set in the database whose content information corresponds to the content condition and whose location information corresponds to the location condition.

Specifically, the local search method according to the present invention includes the following steps:

(a) upon obtaining a search condition word string inputted by a user, determining whether the search condition word string contains a predefined symbol;

(b) when it is determined in step (a) that the search condition word string contains the predefined symbol, setting a string segment before the predefined symbol as a content condition, and a string segment after the predefined symbol as a location condition, and conducting a type-one search on the database, in which the database is searched for at least one data set whose content information corresponds to the content condition and whose location information corresponds to the location condition;

(c) when it is determined in step (a) that the search condition word string does not contain the predefined symbol, conducting a type-two search on the database, in which the database is searched for at least one data set, at least one of the content information and the location information of which has a match with the search condition word string;

(d) determining if a total number of said at least one data set resulting from the type-one search of step (b) exceeds a first predefined number;

(e) when it is determined in step (d) that the total number of said at least one data set resulting from the type-one search of step (b) exceeds the first predefined number, providing a dialog box containing a narrow area scope option that is available for selection by the user;

(f) upon detection of selection of the narrow area scope option, providing a plurality of restricted location options that represent restricted locations corresponding to the location condition;

(g) upon detection of selection of one of the restricted location options, searching for at least one data set in the database whose content information corresponds to the content condition and whose location information corresponds to the selected one of the restricted location options;

(h) determining if a total number of said at least one data set resulting from the type-two search of step (c) exceeds a second predefined number;

(i) when it is determined in step (h) that the total number of said at least one data set resulting from the type-two search of step (c) exceeds the second predefined number, providing a dialog box containing an add location condition option that is available for selection by the user;

(j) upon detection of selection of the add location condition option, providing the predefined symbol right after the search condition word string obtained in step (a);

(k) upon obtaining a supplemented search condition word string inputted by the user, setting a string segment after the predefined symbol as the location condition, and searching for at least one data set in the database whose content information corresponds to the content condition and whose location information corresponds to the location condition.

The advantages of this invention lie in the use of a predefined symbol to distinguish between a content condition and a location condition in a search condition word string so that it is only required to provide a single field, instead of two fields as with the prior art, on the display screen for input by a user, which greatly saves screen space. Moreover, a search can be initiated regardless of the content of the search condition word string. In other words, it is not mandatory for the user to fill in both the content condition and the location condition as in the prior art for initiating a search. Furthermore, the present invention provides the user with the assistance of narrowing the search scope in order to enhance efficiency and minimize volume of data transmission.

BRIEF DESCRIPTION OF THE DRAWINGS

Other features and advantages of the present invention will become apparent in the following detailed description of the preferred embodiment with reference to the accompanying drawings, of which.

*As seen on FIGS. 3A and 3B

DETAILED DESCRIPTION OF THE PREFERRED EMBODIMENT

Figure 1:
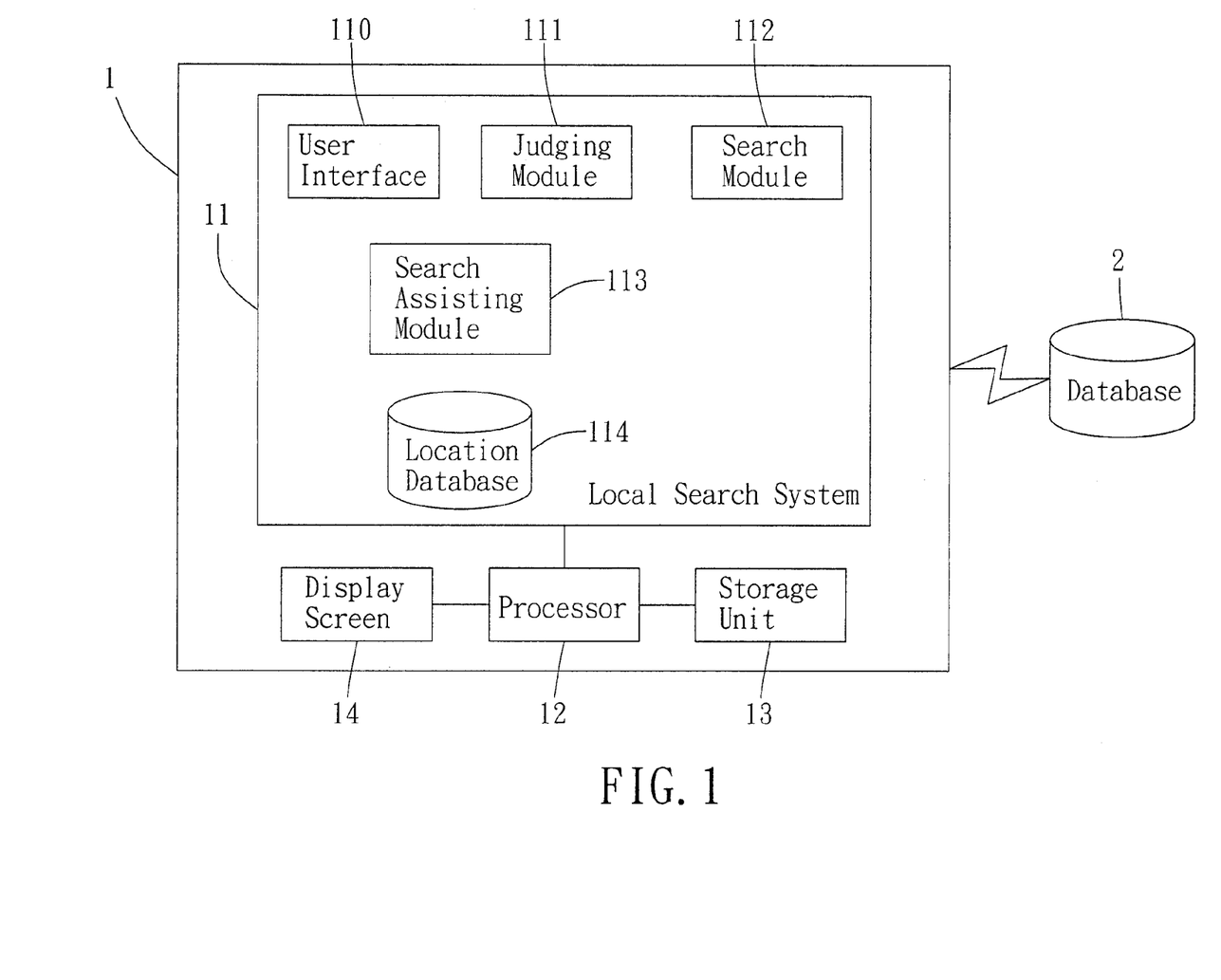
FIG. 1 is a block diagram of the preferred embodiment of a portable electronic device incorporating a local search system according to the present invention.

With reference to FIG. 1, the preferred embodiment of a local search system 11 according to the present invention is for implementation in a portable electronic device 1. The portable electronic device 1 may be a personal navigation assistant (PNA), an intelligent mobile phone, etc. In this embodiment, the portable electronic device 1 is a portable navigation device, such as a PNA. The portable electronic device 1 includes a processor 12, a storage unit 13, and a display screen 14. The local search system 11 configures the portable electronic device 1 for searching a database 2. The portable electronic device 1 may communicate with the database 2 via telecommunication or wireless services such as general packet radio service (GPRS), third generation (3G) mobile communication, wireless local area network (WLAN), etc. The local search system 11 may also be implemented in a computer (not shown), which may be connected to the database 2 via the Internet. The database 2 may be an e-Yellow page database, an e-Map database, etc, and contains a plurality of data sets, each of which includes location information and content information. The content information may include name, address, telephone number of a particular business/store/company, etc.

The local search system 11 may be in the form of a computer program product including a computer readable medium that includes program instructions, which when executed by an electronic device, such as a computer, cause the electronic device to perform the local search method of the present invention. The local search method will be described in detail later. In this embodiment, however, the local search system 11 is in the form of a software product that is downloaded from a server (not shown) and executed by the portable electronic device 1.

The local search system 11 includes a user interface 110, a judging module 111, a search module 112, a search assisting module 113, and a location database 114.

Figure 2:
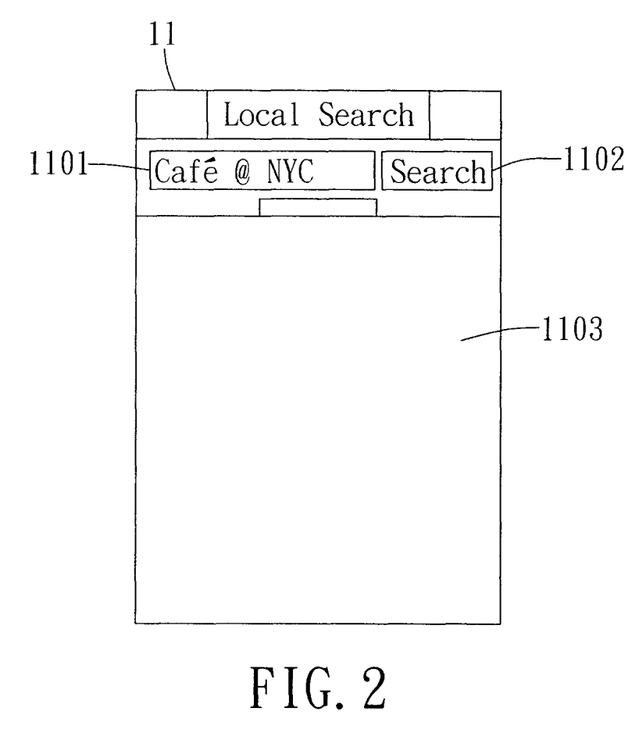
FIG. 2 is a schematic diagram, illustrating display on a display screen of the preferred embodiment.

With further reference to FIG. 2, the user interface 110 is to be loaded into the processor 12 of the portable electronic device 1 for configuring the processor 12 to enable the display screen 14 to display a single field 1101 for input of a search condition word string by a user, and a "search" option 1102 for selection by the user when input of the search condition word string is completed and it is desired to initiate the search. In this embodiment, the display screen 14 is a touch control display screen, and the processor 12 has handwriting recognition functionality. The user interface 110 further configures the processor 12 to display a handwriting input area 1103 so as to facilitate user input of the search condition word string through the touch control display screen. Alternatively, the local search system 11 may further include a touchpad (not shown) or a keyboard (not shown) of the portable electronic device 1 for facilitating user input of the search condition word string. In another implementation, the user interface 110 further configures the processor 12 to enable the display screen 14 to display a virtual keyboard (not shown) for selection by the user so as to input the search condition word string.

The judging module 111 is to be loaded into the processor 12 for configuring the processor 12 to determine whether the search condition word string contains a predefined symbol. In this embodiment, the predefined symbol is "@". Accordingly, in implementations with the keyboard or the virtual keyboard, the "@" key is preferably included. The judging module 111 further configures the processor 12 to set, upon determining that the search condition word string contains the predefined symbol, a string segment before the predefined symbol as a content condition, and a string segment after the predefined symbol as a location condition.

The content condition may contain a single keyword, e.g., "café", or may contain multiple keywords, such as "café restaurant" or "café+restaurant". Therefore, an example of the search condition word string may be "café+restaurant @ NYC".

The search module 112 is to be loaded into the processor 12 for configuring the processor 12 to conduct searches on the database 2. The search assisting module 113 is to be loaded into the processor 12 for configuring the processor 12 to determine if a total number of data set(s) resulting from the search exceeds a corresponding predefined number, and to enable the display screen 14 to display, upon determining that the total number of the data set(s) resulting from the search exceeds the corresponding predefined number, a dialog box with a corresponding suitable narrowing scope option.

Figure 3A:
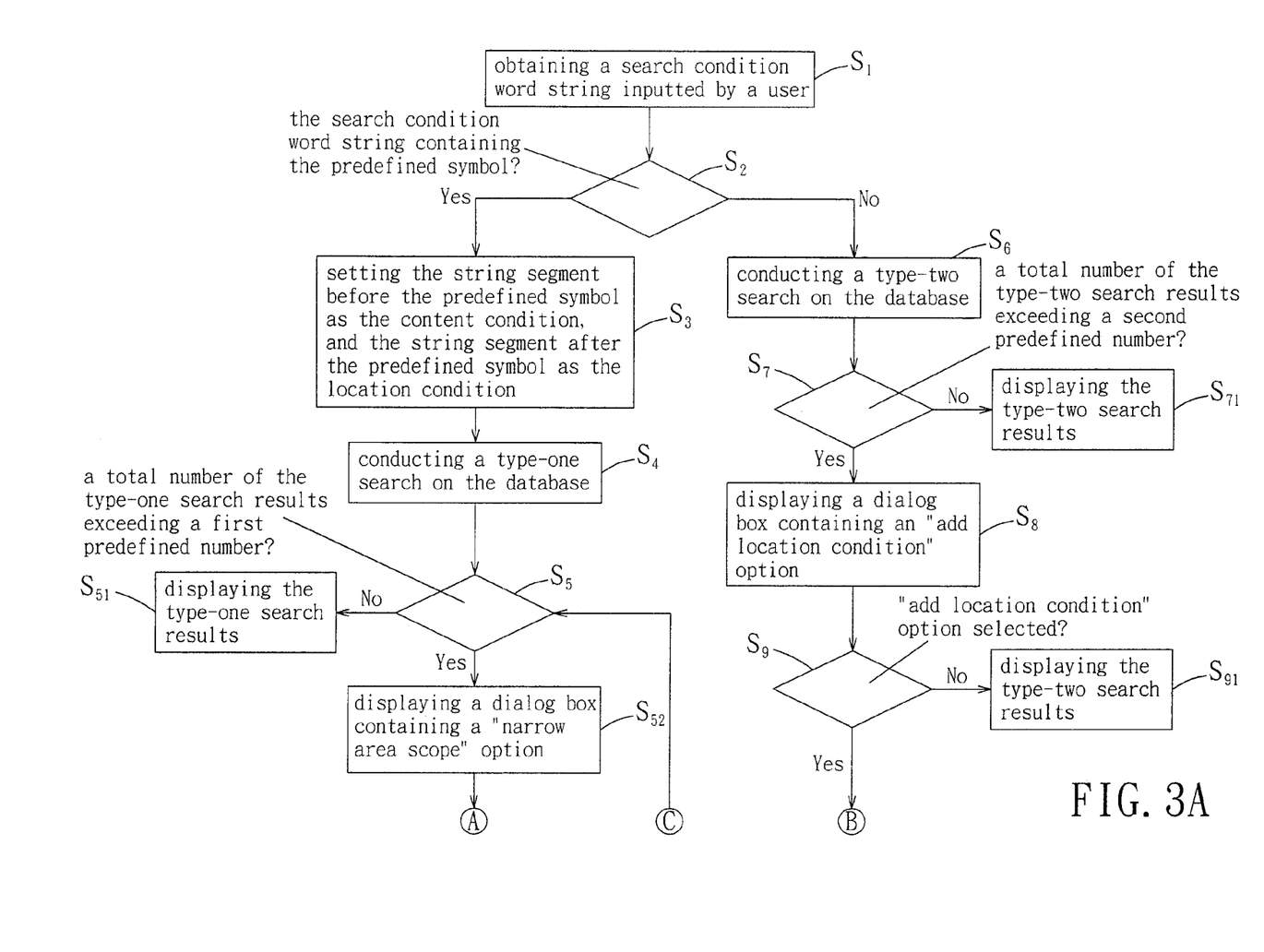
FIG. 3* is a flowchart, illustrating a local search method implemented by the preferred embodiment.
Figure 3B:
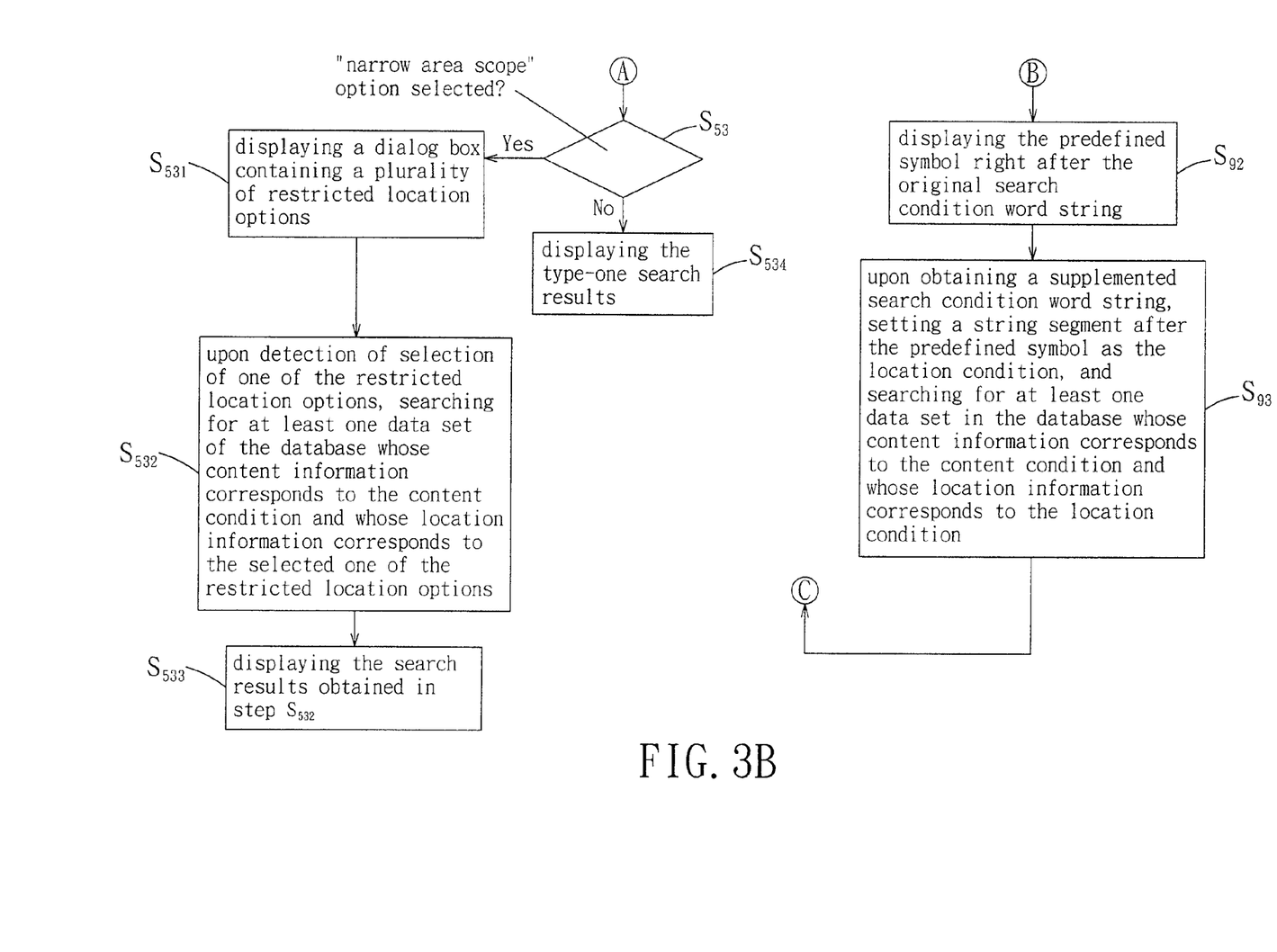

Further details related to the operations of the judging module 111, the search module 112 and the search assisting module 113 will be described hereinbelow with reference to FIG. 1, FIG. 2 and FIG. 3. FIG. 3 illustrates the flowchart of the local search method according to the preferred embodiment of the present invention.

In step $S_1$, a search condition word string inputted by a user is obtained and stored in the storage unit 13 upon detection by the processor 12 that the "search" option displayed on the display screen 14 has been selected.

In step $S_2$, the processor 12 is configured by the judging module 111 to determine whether the search condition word string contains the predefined symbol, i.e., the "@" symbol in this embodiment. When it is determined in step $S_2$ that the predefined symbol is present in the search condition word string, the flow goes to step $S_3$. Otherwise, the flow goes to step $S_6$.

For illustration purposes, in the following description of the flow beginning from step $S_3$, the search condition word string as inputted by the user (also referred hereinafter to as the "original search condition word string") is "café @ NYC" (as shown in FIG. 2), where NYC is the abbreviation of New York City.

In step $S_3$, the processor 12 is configured by the judging module 111 to set the string segment before the predefined symbol as the content condition, and the string segment after the predefined symbol as the location condition. In other words, the original search condition word string is interpreted by the processor 12 as "content condition @ location condition", and is interpreted as "content condition" located at/in "location condition". For example, with the original search condition word string read as "café @ NYC", the foregoing will be interpreted to be "cafés located at/in NYC".

In step $S_4$ following step $S_3$, the processor 12 is configured by the search module 112 to conduct a type-one search on the database 2, in which the database 2 is searched for at least one data set whose content information corresponds to the content condition and whose location information corresponds to the location condition. It should be noted herein that the portable electronic device 1 does not actually perform the search on its own, but merely transmits a search command to a server (not shown) including the database 2, instructing the server to conduct the actual search of the database 2. Upon completing the search, the server informs the portable electronic device 1 of a total number of said at least one data set resulting from the type-one search. For simplicity of description, "said at least one data set resulting from the type-one search" will be referred to hereinafter as "the type-one search results".

In step $S_5$ following step $S_4$, the processor 12 is configured by the search assisting module 113 to determine if the total number of the type-one search results obtained in step $S_4$ exceeds a first predefined number (N1), e.g., 20 in this embodiment. If it is determined in step $S_5$ that the total number of the type-one search results exceeds the first predefined number (N1), the flow goes to step $S_{52}$.

On the other hand, if it is determined in step $S_5$ that the total number of the type-one search results does not exceed the first predefined number (N1), the flow goes to step $S_{51}$, where the processor 12 is configured by the search assisting module 113 to control the display screen 14 to display the type-one search results. Specifically, a request for the type-one search results is transmitted by the portable electronic device 1 to the server, which, in response to the request, transmits the type-one search results to the portable electronic device 1 for storage in the storage unit 13.

Figure 4:
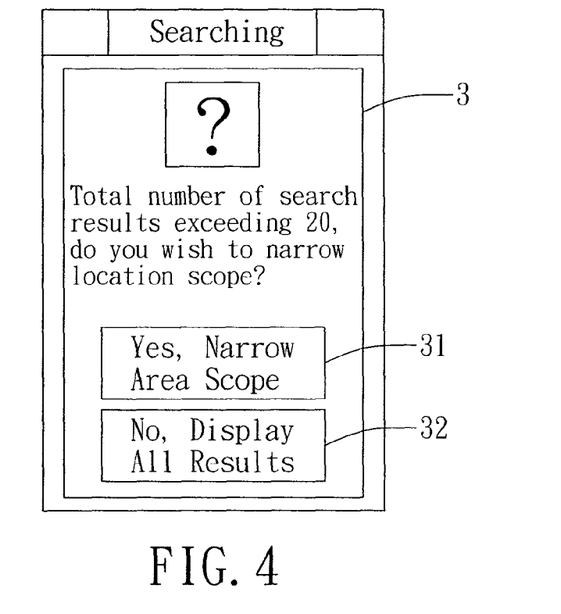
FIG. 4 is a schematic diagram, illustrating an example of a dialog box generated in step $S_{52}$ of the local search method.

In step $S_{52}$, the processor 12 is configured by the search assisting module 113 to enable the display screen 14 to display a dialog box 3 containing a "narrow area scope" option 31 that is available for selection by the user. An example of the dialog box 3 is shown in FIG. 4, where a "show search results"

option 32 available for selection by the user is provided in addition to the "narrow area scope" option 31.

Subsequently, in step $S_{53}$, the processor 12 is configured by the search assisting module 113 to determine if the "narrow area scope" option 31 has been selected. In this embodiment, the processor 12 is configured by the search assisting module 113 to determine which one of the "narrow area scope" option 31 and the "show search results" option 32 has been selected. If it is determined that the "narrow are a scope" option 31 has been selected, the flow goes to step $S_{531}$. If it is determined that the "show search results" option 32 has been selected, the flow goes to step $S_{534}$, where the processor 12 is configured by the search assisting module 113 to enable the display screen 14 to display the type-one search results. As with step $S_5$, the type-one search results are obtained from the server and stored in the storage unit 13 at the request of the portable electronic device 1.

Figure 5:
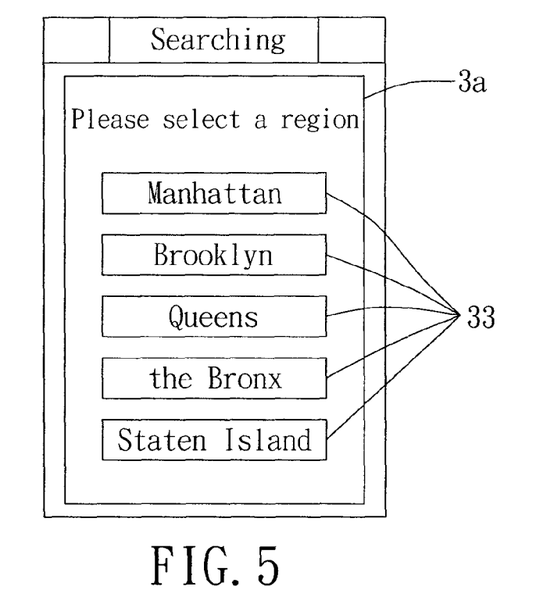
FIG. 5 is a schematic diagram, illustrating an example of a dialog box generated in step $S_{531}$ of the local search method.

In step $S_{531}$, the processor 12 is configured by the search assisting module 113 to enable the display screen 14 to display another dialog box 3a containing a plurality of restricted location options 33 that represent restricted locations corresponding to the location condition and that are available for selection by the user. For example, if the location condition in the original search condition word string as determined in step $S_3$ is "NYC", the restricted location options 33 may represent the five boroughs under New York City, including "Manhattan", "Brooklyn", "Queens", "the Bronx", and "Staten Island". If the location condition as determined in step $S_3$ is "Manhattan", then the restricted location options may include "Downtown Manhattan", "Midtown Manhattan", "Uptown Manhattan", etc. The restricted location options 33 are generated according to the location database 114, in which location names are stored in levels varying in scope, such as in terms of city, borough, district, neighborhood, street blocks, etc.

Subsequently, in step $S_{532}$, upon detection of selection of one of the restricted location options 33, the processor 12 is configured by the search assisting module 113 to search for at least one data set in the database 2 whose content information corresponds to the content condition and whose location information corresponds to the selected one of the restricted location options 33. As noted above, the search is in reality performed by the server. In one implementation, the search of step $S_{532}$ is another type-one search, where the database 2 is searched again using the original content condition and the selected one of the restricted location options 33 as the location condition. In such case, the processor 12 is preferably further configured by the search assisting module 113 to enable the display screen 14 to display, in the field 1101, an updated search condition word string that includes the original content condition and the selected one of the restricted location options 33. Suppose that the selected one of the restricted location options 33 represents "Manhattan", the updated search condition word string displayed in the field 1101 will be "café@ Manhattan". Alternatively, the search of step $S_{532}$ may be conducted at the server end by searching only the type-one search results obtained in step $S_4$ in order to save time.

Next, in step $S_{533}$, the processor 12 is configured to enable the display screen 14 to display the search results obtained in step $S_{532}$. Specifically, the search results are obtained from the server at the request of the portable electronic device 1.

Now, the flow following the determination of the absence of the predefined symbol in the original search condition word string will be described in detail.

For illustration purposes, in the following description of the flow beginning from step $S_6$, the original search condition word string is simply "café".

In step $S_6$, the processor 12 is configured by the search module 112 to conduct a type-two search on the database 2, in which the database 2 is searched for at least one data set that has a match with the search condition word string, at least one of the content information and the location information of which has a match with the search condition word string. In reality, upon completing the search, the server informs the portable electronic device 1 of a total number of said at least one data set resulting from the type-two search. For simplicity of description, "said at least one data set resulting from the type-two search" will be referred to hereinafter as "the type-two search results".

Subsequently, in step $S_7$, the processor 12 is configured by the search assisting module 113 to determine if the total number of the type-two search results exceeds a second predefined number (N2), which may or may not be different from the first predefined number (N1). In this embodiment, both the first and second predefined numbers (N1, N2) are 20. If it is determined in step $S_7$ that the total number of the type-two search results exceeds the second predefined number (N2), the flow goes to step $S_8$.

On the other hand, if it is determined in step $S_7$ that the total number of the type-two search results does not exceed the second predefined number (N2), the flow goes to step $S_{71}$, where the processor 12 is configured by the search assisting module 113 to enable the display screen 14 to display the type-two search results. Specifically, a request for the type-two search results is transmitted by the portable electronic device 1 to the server, which, in response to the request, transmits the type-two search results to the portable electronic device 1 for storage in the storage unit 13.

Figure 6:
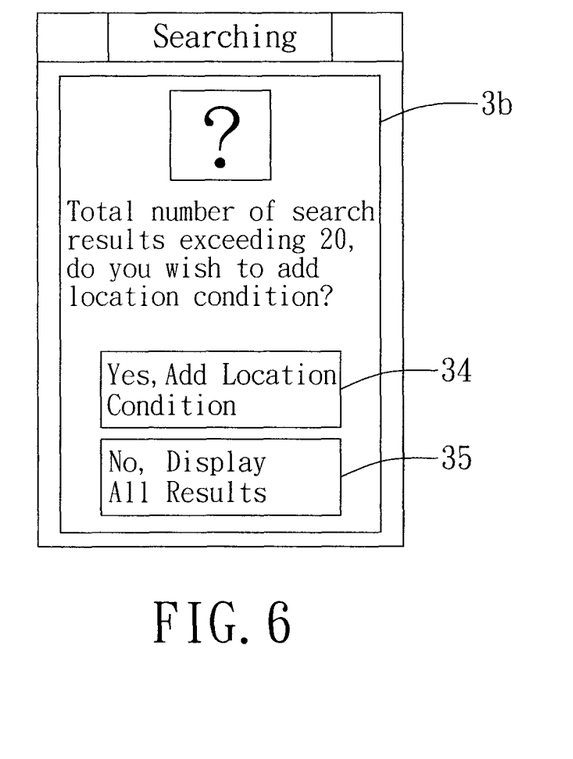
FIG. 6 is a schematic diagram, illustrating an example of a dialog box generated in step $S_8$ of the local search method.

In step $S_8$, the processor 12 is configured by the search assisting module 113 to enable the display screen 14 to display a dialog box 3b containing an "add location condition" option 34 available for selection by the user. An example of the dialog box 3b is shown in FIG. 6, where a "show search results" option 35 available for selection by the user is provided in addition to the "add location condition" option 34.

In step $S_9$ subsequent to step $S_8$, the processor 12 is configured by the search assisting module 113 to determine if the "add location condition" option 34 has been selected. In this embodiment, the processor 12 determines which one of the "add location condition" option 34 and the "show search results" option 35 has been selected. If it is determined that the "show search results" option 35 has been selected, the flow goes to step $S_{91}$, where the processor 12 is configured by the search assisting module 113 to enable the display screen 14 to display the type-two search results, which are obtained from the server at the request of the portable electronic device 1. Alternatively, if the current location of the portable electronic device 1 is known via, e.g., GPS, the processor 12 may be configured to enable the display screen 14 to display those type-one search results corresponding to locations in the neighborhood of the current location.

If it is determined in step $S_9$ that the "add location condition" option 34 has been selected, the flow goes to step $S_{92}$, where the processor 12 is configured by the search assisting module 113 to enable the display screen 14 to display the predefined symbol in the field 1101 right after the original search condition word string. In the example previously disclosed, the word string "café @" would be in the field 1101 after step $S_{92}$ is performed.

Subsequently, in step $S_{93}$, upon obtaining a supplemented search condition word string inputted by the user, the processor 12 is configured by the judging module 111 to set a string segment after the predefined symbol as the location condition, and the processor 12 is configured by the search module 112 to search (i.e., send a search command to the server) for at least one data set in the database 2 whose content information corresponds to the content condition and whose location information corresponds to the location condition. As with step $S_{532}$, the search may be a new type-one search, where the database 2 is searched again using the original content condition and the location condition determined from the supplemented search condition word string. Alternatively, the search of step $S_{93}$ may be conducted by searching only the type-two search results obtained in step $S_6$. At the end of the search, the server transmits a total number of the new search results back to the portable electronic device 1.

After step $S_{93}$ is completed, the flow goes to step $S_5$ to determine whether the total number of the new search results exceeds the first predefined number (N1).

In sum, the local search method and system according to the present invention utilizes the predefined symbol, such as " @ " in the preferred embodiment, as a means for distinguishing between the content condition and the location condition in a search condition word string inputted by the user in a single field displayed on the display screen 14, such that the need to display two separate fields in the prior art, either concurrently or consecutively, is no longer required. This not only saves screen space, but also saves input time for the user. In addition, the user has the option of inputting only one of the content condition and the location condition as the search condition word string and is still able to initiate a search when such is done. This allows more flexibility in the local search service. Moreover, with the mechanism that provides narrowing scope options at suitable times, the volume of data to be received by the portable electronic device 1 can be significantly reduced, which in turn reduces the transmission fees incurred thereby.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A local search method to be implemented by a portable electronic device for searching a database that contains a plurality of data sets, each of which includes location information and content information, the local search method comprising the steps of:
   upon obtaining a search condition word string inputted by a user in a single field, determining whether the search condition word string contains a predefined symbol " @ "; and
   when it is determined that the search condition word string contains the predefined symbol " @ ", setting a complete string segment before the predefined symbol " @ " as a content condition, and a complete string segment after the predefined symbol " @ " as a location condition, and conducting a type-one search on the database, in which the database is searched for at least one data set whose content information corresponds to the content condition and whose location information corresponds to the location condition.

2. The local search method as claimed in claim 1, further comprising the step of:
   when it is determined that the search condition word string does not contain the predefined symbol " @ ", conducting a type-two search on the database, in which the database is searched for at least one data set, at least one of the content information and the location information of which has a match with the search condition word string.

3. The local search method as claimed in claim 2, further comprising the steps of:
   determining if a total number of said at least one data set resulting from the type-two search of the step of conducting a type-two search exceeds a predefined number;
   when it is determined that the total number of said at least one data set resulting from the type-two search of the step of conducting a type-two search exceeds the predefined number, providing a dialog box containing an add location condition option that is available for selection by the user;
   upon detection of selection of the add location condition option, providing the predefined symbol " @ " right after the search condition word string obtained in step of determining whether the search condition word string contains a predefined symbol " @ "; and
   upon obtaining a supplemented search condition word string inputted by the user, setting a complete string segment after the predefined symbol " @ " as the location condition, and searching for at least one data set in the database whose content information corresponds to the content condition and whose location information corresponds to the location condition.

4. The local search method as claimed in claim 1, further comprising the steps of:
   determining if a total number of said at least one data set resulting from the type-one search of step of setting a complete string segment exceeds a predefined number;
   when it is determined that the total number of said at least one data set resulting from the type-one search of the step of setting complete string segment exceeds the predefined number, providing a dialog box containing a narrow area scope option that is available for selection by the user;
   upon detection of selection of the narrow area scope option, providing a plurality of restricted location options that represent restricted locations corresponding to the location condition; and
   upon detection of selection of one of the restricted location options, searching for at least one data set in the database whose content information corresponds to the content condition and whose location information corresponds to the selected one of the restricted location options.

5. The local search method as claimed in claim 1, wherein the electronic device is a portable navigation device.

6. A computer program product, comprising a computer readable storage medium that includes program instructions, which when executed by an electronic device, cause the electronic device to perform the local search method according to claim 1.

7. The local search method of claim 1, wherein the predefined symbol is not searched while conducting the type-one search on the database.

8. A local search system for implementation in a portable electronic device, said local search system configuring the portable electronic device for searching a database that contains a plurality of data sets, each of which includes location information and content information, the electronic device including a display screen and a processor, said local search system comprising:

a user interface to be loaded into the processor for configuring the processor to enable the display screen to display a single field for input of a search condition word string by a user;

a judging module to be loaded into the processor for configuring the processor to determine whether the search condition word string contains a predefined symbol "@", and to set, upon determining that the search condition word string contains the predefined symbol "@", a complete string segment before the predefined symbol "@" as a content condition, and a complete string segment after the predefined symbol "@" as a location condition; and a search module to be loaded into the processor for configuring the processor to conduct a type-one search on the database, in which the database is searched for at least one data set whose content information corresponds to the content condition and whose location information corresponds to the location condition.

9. The local search system as claimed in claim 8, further comprising a keyboard that includes an "@" key.

10. The local search system as claimed in claim 8, the display screen being a touch control display screen, wherein said user interface further configures the processor to enable the display screen to display a virtual keyboard for selection by the user, the virtual keyboard containing a "@" key.

11. The local search system as claimed in claim 8, wherein said search module further configures the processor to conduct a type-two search on the database, in which the database is searched for at least one data set that has a match with the search condition word string, when it is determined by said judging module that the search condition word string does not contain the predefined symbol "@".

12. The local search system as claimed in claim 11, further comprising:

a search assisting module to be loaded into the processor for configuring the processor to determine if a total number of said at least one data set resulting from the type-two search exceeds a predefined number, and to enable, upon determining that the total number of said at least one data set resulting from the type-two search exceeds the predefined number, the display screen to display a dialog box containing an add location condition option available for selection by the user, said search assisting module further configuring the processor to enable the display screen to display the predefined symbol "@" right after the search condition word string upon determining that the add location condition option has been selected by the user;

wherein upon obtaining a supplemented search condition word string inputted by the user, said judging module further configures the processor to set a string segment after the predefined symbol "@" as the location condition, and said search module further configures the processor to search for at least one data set in the database whose content information corresponds to the content condition and whose location information corresponds to the location condition.

13. The local search system as claimed in claim 8, further comprising:

a search assisting module to be loaded into the processor for configuring the processor to determine if a total number of said at least one data set resulting from the type-one search exceeds a predefined number, and to enable the display screen to display, upon determining that the total number of said at least one data set resulting from the type-one search exceeds the predefined number, a dialog box containing a narrow area scope option that is available for selection by the user, said search assisting module further configuring the processor to enable the display screen to display, upon detection of selection of the narrow area scope option, a plurality of restricted location options that represent restricted locations corresponding to the location condition and that are available for selection by the user;

wherein said search module further configures the processor to search, upon detection of selection of one of the restricted location options, for at least one data set in the database whose content information corresponds to the content condition and whose location information corresponds to the selected one of the restricted location options.

14. The local search system as claimed in claim 8, wherein the electronic device is a portable navigation device.

15. A portable electronic device comprising the local search system as claimed in claim 8.

16. A local search method, comprising:

searching for a predefined symbol "@" in a search word string inputted by a user;

setting a string segment before the predefined symbol "@" as a content condition, and a string segment after the predefined symbol "@" as a location condition; and searching a database for at least one data set whose content information corresponds to the content condition and whose location information corresponds to the location condition, the database storing a plurality of data sets, each of which comprises location information and, content information.

* * * * *